(12) United States Patent
Fletcher et al.

(10) Patent No.: US 10,207,787 B2
(45) Date of Patent: Feb. 19, 2019

(54) AUTOMATED BRAIDED SLEEVE PLACEMENT AND TENSIONING

(71) Applicant: The Boeing Company, Chicago, IL (US)

(72) Inventors: Luke Fletcher, Yarraville (AU);
Ashleigh Raoul Nesbit, Williamstown (AU); Dominic Wierzbicki, Melbourne (AU); Richard Bain, Hawthorn (AU); Andrew Klimovski, Melbourne (AU); Peter Nathan Steele, Melbourne (AU); Martin Szarski, Canterbury (AU); Peter Lockett, Melbourne (AU); Manning Scarfe, Ascot Vale (AU)

(73) Assignee: The Boeing Company, Chicago, IL (US)

( * ) Notice: Subject to any disclaimer, the term of this patent is extended or adjusted under 35 U.S.C. 154(b) by 570 days.

(21) Appl. No.: 14/938,767

(22) Filed: Nov. 11, 2015

(65) Prior Publication Data
US 2017/0129583 A1    May 11, 2017

(51) Int. Cl.
*B64C 1/12*    (2006.01)

(52) U.S. Cl.
CPC ..................................... *B64C 1/12* (2013.01)

(58) Field of Classification Search
CPC .......... B64C 1/12; B29C 66/71; B29C 63/36; A61L 31/06; A61L 31/048; F16L 55/1651; F16L 55/179; Y10T 29/4987; A61M 25/019
See application file for complete search history.

(56) References Cited

U.S. PATENT DOCUMENTS

| 4,573,251 | A | * | 3/1986 | Hillyard | ................. | B29C 63/18 |
| | | | | | | 29/450 |
| 6,619,886 | B1 | * | 9/2003 | Harrington | ............ | B29C 63/36 |
| | | | | | | 138/97 |

* cited by examiner

*Primary Examiner* — Jacob J Cigna
*Assistant Examiner* — Lee A Holly
(74) *Attorney, Agent, or Firm* — Haynes and Boone, LLP

(57) ABSTRACT

A method for drawing a flexible sleeve over an elongated mandrel includes placing a ring within a lumen of the sleeve. A first end of the sleeve is fixed against movement relative to a first end of the mandrel. A first end portion of the sleeve is inverted over a first end portion of the mandrel so as to define a circumferential cuff in the sleeve, and the ring is positioned concentrically within the circumferential cuff. Using, e.g., a magnet, the ring is then urged longitudinally along the mandrel and toward an opposite, second end thereof, such that the sleeve is inverted over at least an outer surface of the mandrel.

19 Claims, 11 Drawing Sheets

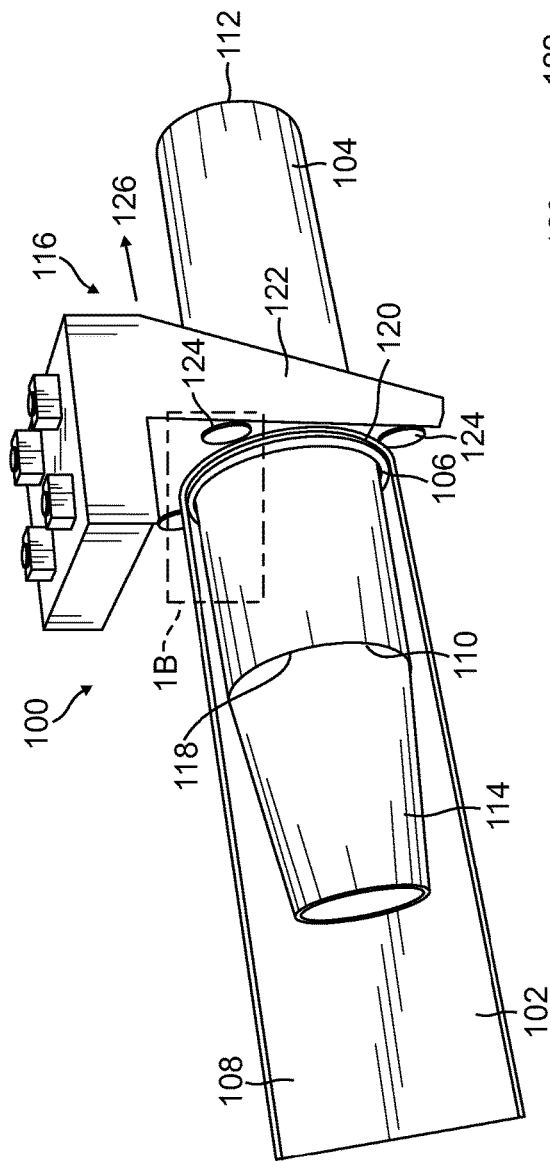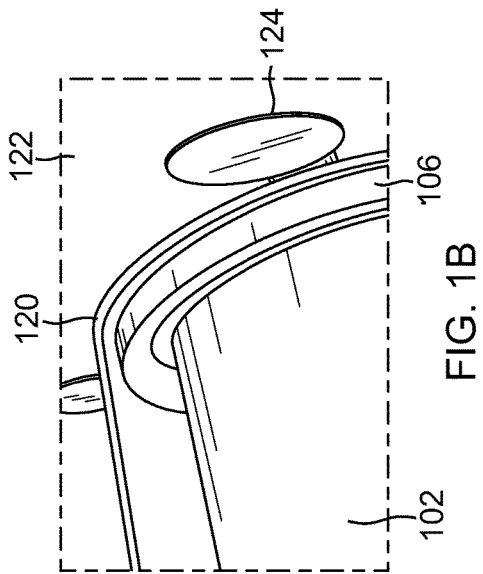
FIG. 1A
FIG. 1B

AUTOMATED BRAIDED SLEEVE PLACEMENT AND TENSIONING

BACKGROUND

1. Technical Field

This application relates to manufacturing systems and methods in general, and more specifically, to methods and systems for the automated placement of flexible sleeves on elongated mandrels.

2. Related Art

The manufacture of composite structures, e.g., composite-bodied aircraft, involves the fabrication of structural components comprising matrices of a plastic, e.g., a thermosetting resin, within which reinforcing fibers, e.g., carbon or glass fibers, are embedded.

Some such structural components, e.g., door surrounds, stringers, spars, and similar long/thin geometries, can be fabricated by placing a flexible sleeve, e.g., a braided glass or carbon fiber sleeve, over an elongated mandrel, and then encapsulating the sleeve within a layer of a liquid plastic, e.g., a thermosetting resin, which is subsequently cured, partially or fully. In some embodiments, the sleeve can then be removed from the mandrel or vice-versa for subsequent processing, and in others, the mandrel, which can be solid or tubular, can remain within the sleeve and comprise an integral, "core" portion of the finished product.

Sleeves, and in particular, bi-axially braided sleeves, are intrinsically difficult to install onto elongated mandrels manually due to their material properties, in which a lack of longitudinal tension can result in an undesirable increase in the diameter of the sleeve. The issue is exacerbated by the requirement that material placement be uniformly smooth in order to avoid wrinkles in the finished product. Consequently, manual processes tend to be slow and result in substantial variability in the finished product quality. Once the length of the sleeve exceeds a certain length, manual handling and loading of the sleeve becomes very difficult, unless automation methods and apparatus are employed. An example of this is in the case of long (>100 in.) aircraft stiffeners, such as fuselage and wing skin stiffeners and vent stringers. During manual handling, there is the potential for the introduction of Foreign Object Debris (FOD) and the material can be easily damaged. Additionally, there are Environmental Health and Safety (EHS) issues associated with the handling of, e.g., glass and carbon fibers, such as skin and respiratory irritation.

Accordingly, there is a long-felt but as yet unsatisfied need in the industry for systems and methods for the automated placing of flexible sleeves on elongated mandrels that overcome the foregoing and other problems of the conventional manual placement techniques.

SUMMARY

In accordance with the present disclosure, example embodiments of systems and methods are provided for automatically drawing a braided sleeve over a mandrel with a controllable longitudinal tension that can overcome the above and other drawbacks of the prior art.

In one example embodiment, a method for drawing a flexible sleeve over an elongated mandrel comprises placing a ring within a lumen of the sleeve. A first end of the sleeve is fixed against movement relative to a first end of the mandrel. A first end portion of the sleeve is inverted over a first end portion of the mandrel so as to define a circumferential cuff in the sleeve, and the ring is positioned concentrically within the circumferential cuff. The ring is then urged longitudinally along the mandrel and toward an opposite, second end thereof, such that the sleeve is inverted over an outer surface of the mandrel.

In another example embodiment, a machine for drawing a flexible sleeve over an elongated mandrel comprises a ring disposed within a lumen of the sleeve, and a first mechanism for urging the ring longitudinally along the mandrel and toward an opposite, second end thereof, such that the sleeve is inverted over an outer surface of the mandrel, wherein a first end of the sleeve is fixed against movement relative to a first end of the mandrel, a first end portion of the sleeve is inverted over a first end portion of the mandrel so as to define a circumferential cuff in the sleeve, and the ring is positioned concentrically within the circumferential cuff.

In another example embodiment, a system for drawing a flexible sleeve over an elongated mandrel comprises means for inserting a ring within a lumen of the sleeve, means for fixing a first end of the sleeve against movement relative to a first end of the mandrel, means for inverting a first end portion of the sleeve over a first end portion of the mandrel so as to define a circumferential cuff in the sleeve, means for positioning the ring concentrically within the circumferential cuff, and means for urging the ring longitudinally along the mandrel and toward an opposite, second end thereof at a selected rate, such that the sleeve is inverted over an outer surface of the mandrel.

The scope of the invention is defined by the claims, which are incorporated into this section by reference. A better understanding of the automated sleeve placement and tensioning systems and methods of the present disclosure, as well as an appreciation of the above and additional advantages thereof, will be afforded to those of skill in the art by a consideration of the following detailed description of one or more example embodiments thereof. In this description, reference is made to the various views of the appended sheets of drawings, which are briefly described below, and within which like reference numerals are used to identify like ones of the elements illustrated therein.

BRIEF DESCRIPTION OF THE SEVERAL VIEWS OF THE DRAWINGS

FIG. 1A is a partial upper-and-side perspective view of an example embodiment of a semiautomatic machine for placing a sleeve onto an elongated mandrel in accordance with the present disclosure;

FIG. 1B is an enlarged detail view of the area outlined in phantom lines in FIG. 1A;

DETAILED DESCRIPTION

Figure 2A:
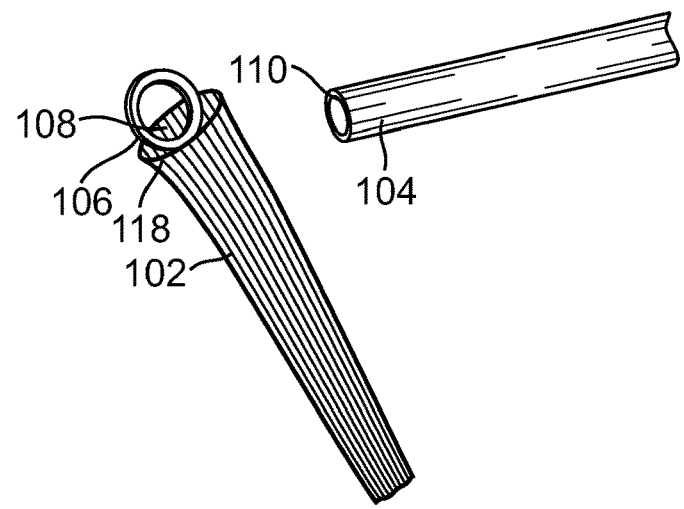
FIGS. 2A-2J are upper-and-side perspective views illustrating successive steps involved in an example embodiment of a method for placing a sleeve onto an elongated mandrel using the example machine of FIGS. 1A and 1B.

This disclosure presents example embodiments of automated systems and methods for drawing a braided sleeve over a mandrel with a uniform longitudinal tension. These systems and methods enable reliable, high-quality, repeatable, high-rate automated sleeve layup, by taking advantage of intrinsic braid properties to maintain longitudinal tension in the sleeve at the point of its placement on the mandrel By handling material only at the placement point, wrinkles and damage to the sleeve are substantially reduced, as are the production of FOD and associated EHS issues.

As discussed in more detail below, the novel methods of the present disclosure utilize a technique of inverting a sleeve, i.e., turning it inside out, over a mandrel, rather than the prior art methods of alternately bunching and extending the sleeve longitudinally over the mandrel in an "inchworm" fashion. In one possible embodiment, magnetism can be utilized to locate and guide a ferrous ring disposed inside a circumferential cuff in the sleeve and against a magnetized flange of, e.g., a robot end-effector, to enable the sleeve to slip through between the ring and the flange at the point of placement of the sleeve upon the mandrel. As the ring is drawn along the mandrel by the magnet, the sleeve is continuously drawn between the ring and the magnetic flange, and thereby inverted or turned inside out along the mandrel, such that the interior surface of the sleeve becomes its exterior surface, and vice-versa, and such that the resulting longitudinal tension exerted on the sleeve during the drawing pulls it tight against the mandrel.

As also discussed in more detail below, the magnetic field can be produced by permanent magnets, e.g., rare-earth magnets, or by electro-magnets, the latter enabling a variable control of magnetic field strength, thereby enabling a precise control of sleeve tension and ring placement. Additionally, the magnetic field strength can be uniquely controlled in segments around the ring profile, thereby enabling varying braid tension to be produced across the respective braid geometries of the sleeve. As will be seen, the novel systems and methods are not reliant on any particular mandrel geometry or sleeve bias angle.

FIG. 1A is a partial upper-and-side perspective view of an example embodiment of a semiautomatic machine 100 for placing a flexible sleeve 102 onto an elongated mandrel 104 in accordance with the present disclosure, and FIG. 1B is an enlarged detail view of the portion of the machine 100 of FIG. 1A outlined in phantom lines. As will be familiar to those of some skill in this art, the sleeve 102 can comprise a plurality of woven or braided, e.g., bi-axially braided, fibers, or alternatively, a thin film or "veil" of, e.g., a thermoplastic or thermosetting material. The fibers can be used, e.g., to reinforce a composite structure formed upon or integral with the elongated mandrel 104, and the veil can be used, e.g., to attach the sleeve 102 to the mandrel 104 at selected locations thereon, as described in more detail below.

As illustrated in FIGS. 1A and 1B, the example sleeve placing machine 100 can comprise a ring 106, which advantageously can be made of a ferrous material, disposed within the lumen 108 of the sleeve 102, i.e., the elongated hollow space inside the tubular sleeve 102. In the particular example embodiments described and illustrated herein, the corresponding cross-sectional shapes of the ring 106 and the mandrel 104 are shown as circular. However, as discussed above, the ring 106 and mandrel 104 can have any corresponding cross-sectional shapes, e.g., elliptical or polygonal, depending on the particular application at hand. The mandrel 104 has a front or first end 110, and can be horizontally supported in a cantilevered fashion from an opposite back or second end 112 thereof, or alternatively or additionally, can be supported continuously or at discrete intervals along its length. As discussed above, the mandrel 104 can be solid or tubular in form, can have any cross-sectional shape corresponding to that of the central opening in the ring 104, and advantageously, can include a tapered surface 114, e.g., a frusto-conical surface, extending longitudinally from the first end 110 of the mandrel 104, and which is advantageously configured to "lead," i.e., feed, the sleeve 102 smoothly onto the first end 110 of the mandrel 104.

The example sleeve placing machine 100 further includes an urging mechanism 116 that is configured to urge the ring 106 longitudinally along the mandrel 104 and toward the opposite, second end thereof in a controlled manner, such that the sleeve 102 is thereby inverted, i.e., turned inside out, over the outer surface of the mandrel 104, as discussed above. As also discussed in more detail below, in the particular example embodiment of FIGS. 1A and 1B, a first end 118 of the sleeve 102 is fixed against movement relative to the first end 110 of the mandrel 104, a first end portion of the sleeve 102 adjacent to the first end 118 thereof is inverted over a first end portion of the mandrel 102 adjacent to its first end 110 so as to define a circumferential cuff 120 in the sleeve 102, and the ring 106 is positioned concentrically within the circumferential cuff 120. This preliminary or starting arrangement of the elements, which can be effected manually or by automated equipment, enables the sleeve 102 to be inverted over the mandrel 104 with a controlled longitudinal tension at each point of placement along the mandrel 104.

As discussed above, the ring 106 can comprise a ferrous material, and the urging mechanism 116 can comprise a magnet disposed immediately adjacent to the ring 106, such that the sleeve 102 is slidably disposed between a surface of the ring 106 and a surface of the magnet, and such that the magnet exerts a longitudinal magnetic force on the ring 106 through the sleeve 102. In the particular example embodiment of FIGS. 1A and 1B, the magnet comprises, e.g., a ferromagnetic circumferential flange 122 containing, e.g., one or more of magnets 124, which serve to magnetize the entire flange 122 through magnetic induction, and the urging mechanism 116 can comprise a second mechanism (not illustrated in FIGS. 1A or 1B), e.g., the arm of a robot, that is configured to urge the magnetized flange 122 longitudinally along the mandrel 104 at a selected rate in the direction of the arrow 126 in FIG. 1A.

As discussed above, the magnetic field induced in the flange 122 can be produced by one or more permanent magnets 124, for example, rare-earth magnets 124, that are, for example, circumferentially distributed around the flange 122, or alternatively, by one or more electro-magnets 124, the latter enabling a variable control of the magnetic field strength to be exerted by the flange 122 on the ring 106 by controlling the respective electrical current(s) in the electromagnet(s) 124. This enables a precise control of the longitudinal tension exerted on the sleeve 102 by and between the ring 106 and the flange 122 during placement of the sleeve 102. Additionally, the magnetic field strength can be uniquely controlled at selected circumferential locations around the flange 122, thereby enabling a varying braid tension to be produced across respective braid geometries of the sleeve 102.

As those of some skill will understand, the longitudinal tension exerted by the sleeve 102 during placement is also a function of the rate at which the ring 102 and corresponding circumferential cuff 120 are moved longitudinally along the mandrel 104. Thus, a very precise control can be exerted over the longitudinal tension exerted on the sleeve 102 during its inversion on the mandrel 104 by controlling one, the other, or both of the magnetic force exerted by the magnetic flange 122 on the ring 106, and the rate at which the magnetic flange 122 is urged along the mandrel 104.

Figure 2B:
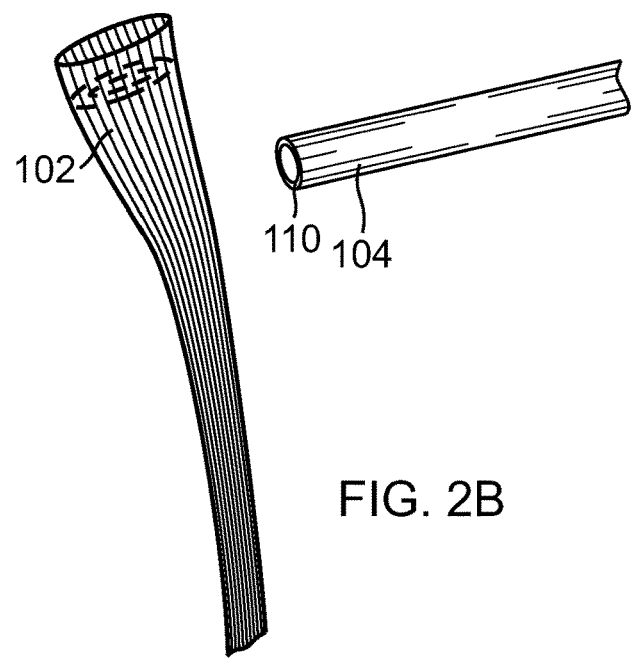
Figure 2C:
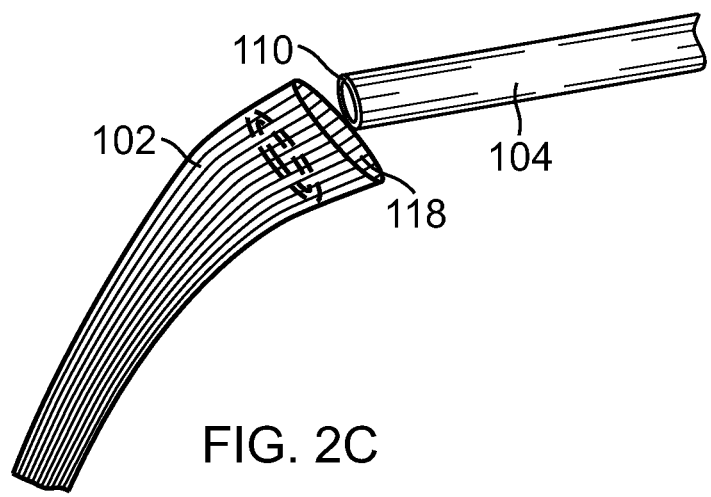
Figure 2D:
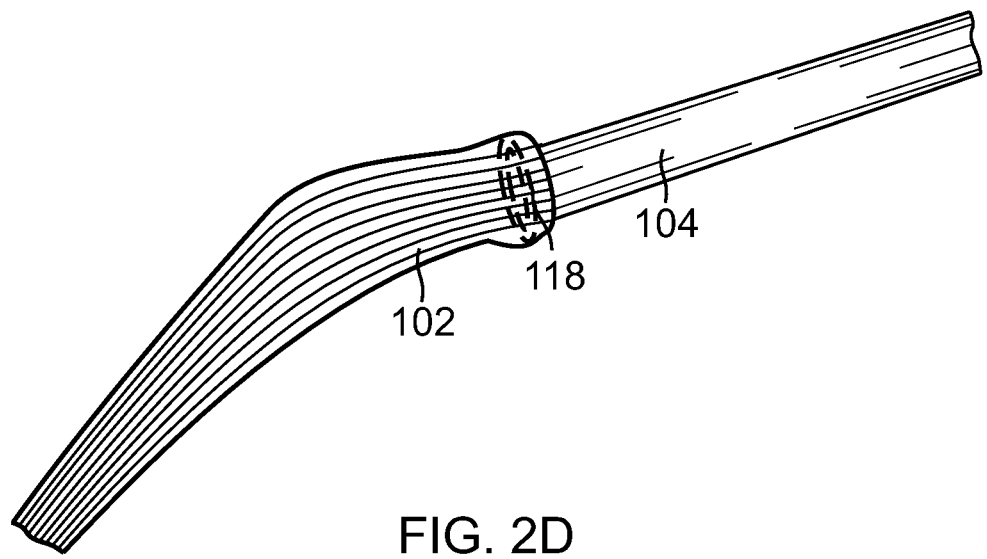
Figure 2E:
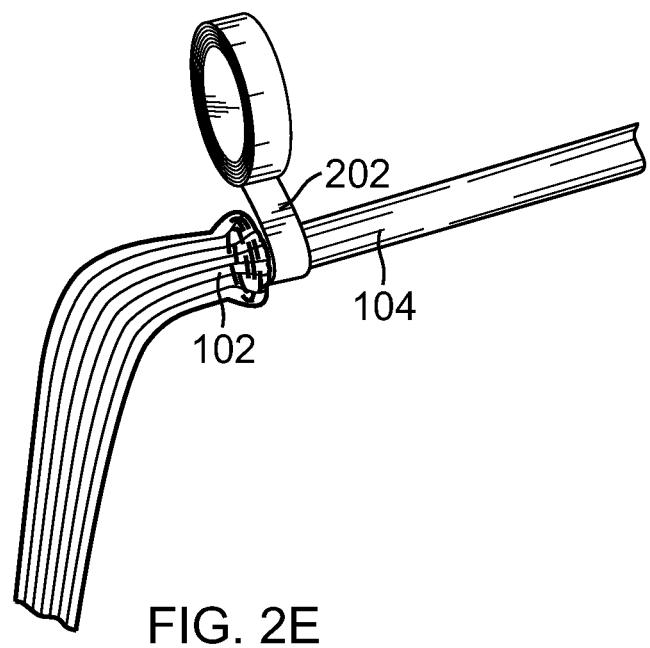

FIGS. 2A-2J are upper-and-side perspective views respectively illustrating successive steps involved in an example embodiment of a method for placing a sleeve 102 onto an elongated mandrel 104 using the example machine 100 of FIGS. 1A and 1B. As illustrated in FIGS. 2A and 2B, the example method begins with placing the ring 106 within the lumen 118 of the sleeve 102. The first end 110 of the sleeve 102 is then fixed against movement relative to the first end 110 of the mandrel 104. As illustrated in FIGS. 2C-2E, in the particular example method illustrated, this step can comprise placing the first end 118 of the sleeve 102 over the first end 110 of the mandrel 104 such that a portion of the sleeve 102 adjacent to its first end 110, i.e., a first end portion, is disposed over, or overlaps, an end portion of the mandrel 102 adjacent to its first end 110, then securing the first end of the sleeve 118 to the mandrel 104 with a clamping or fixing mechanism 202, e.g., a spring-loaded clamping ring or a band of an adhesive tape.

Figure 2F:
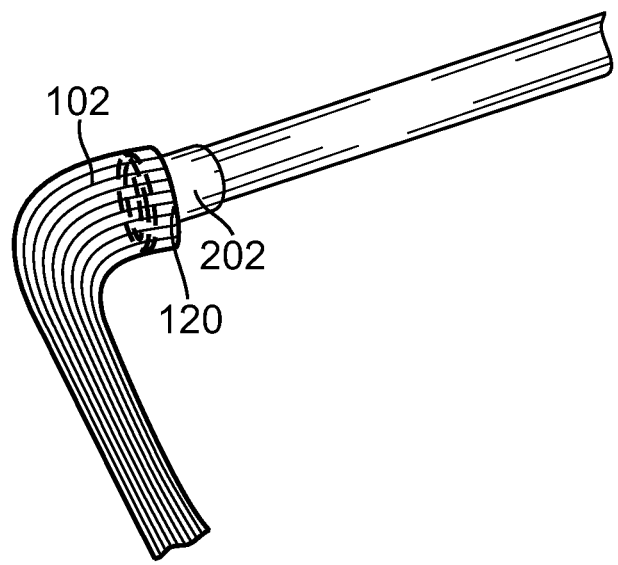
Figure 2G:
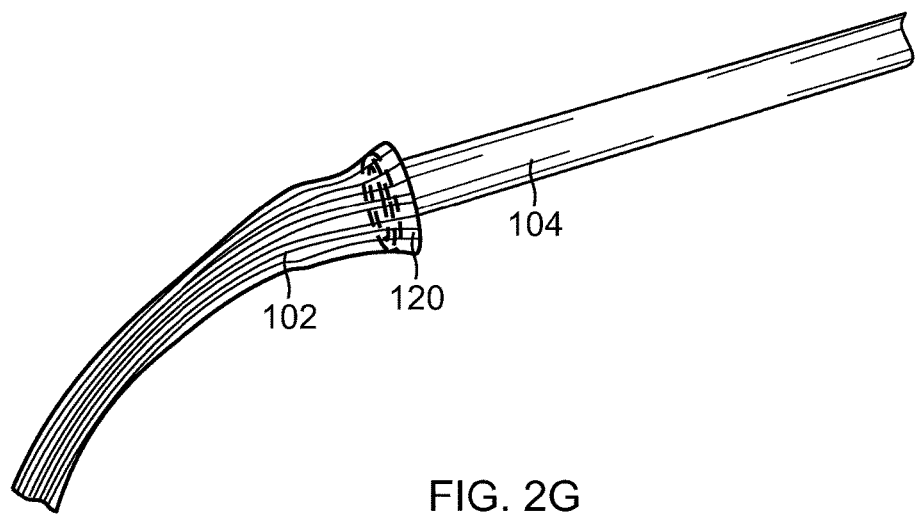

Next, as illustrated in FIGS. 2F and 2G, the first end portion of the sleeve 102 is inverted over the first end portion of the mandrel 104 and the clamping band 202 so as to define the circumferential cuff 120 in the sleeve 102, with the ring 106 positioned concentrically within the circumferential cuff 120.

Figure 2H:
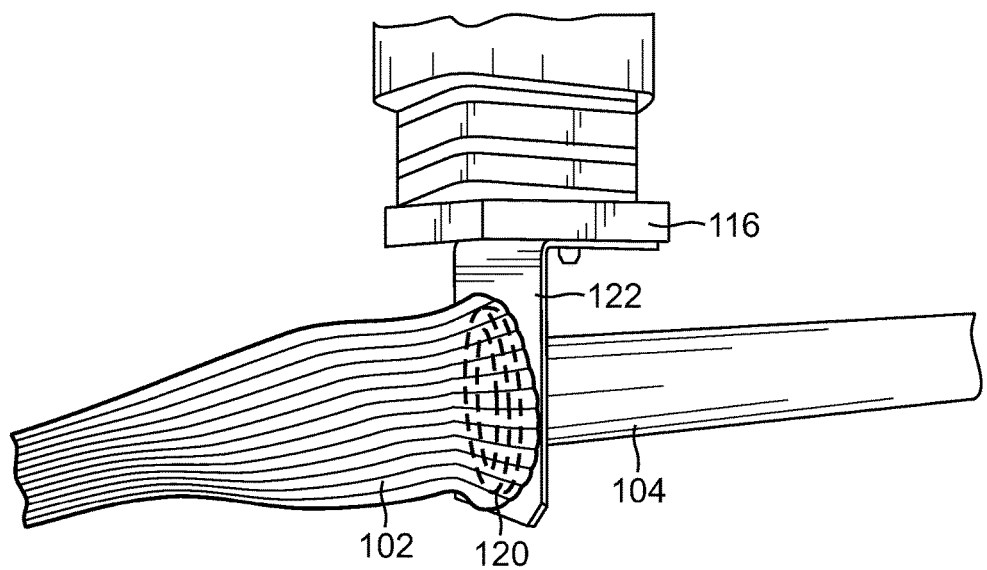
Figure 2I:
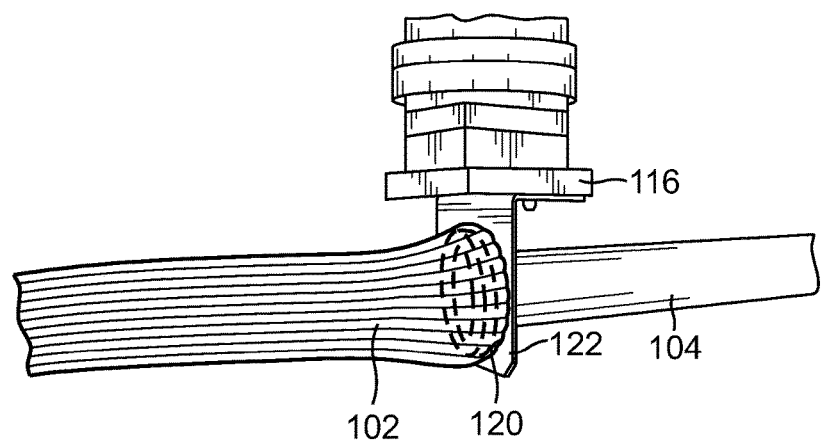
Figure 2J:
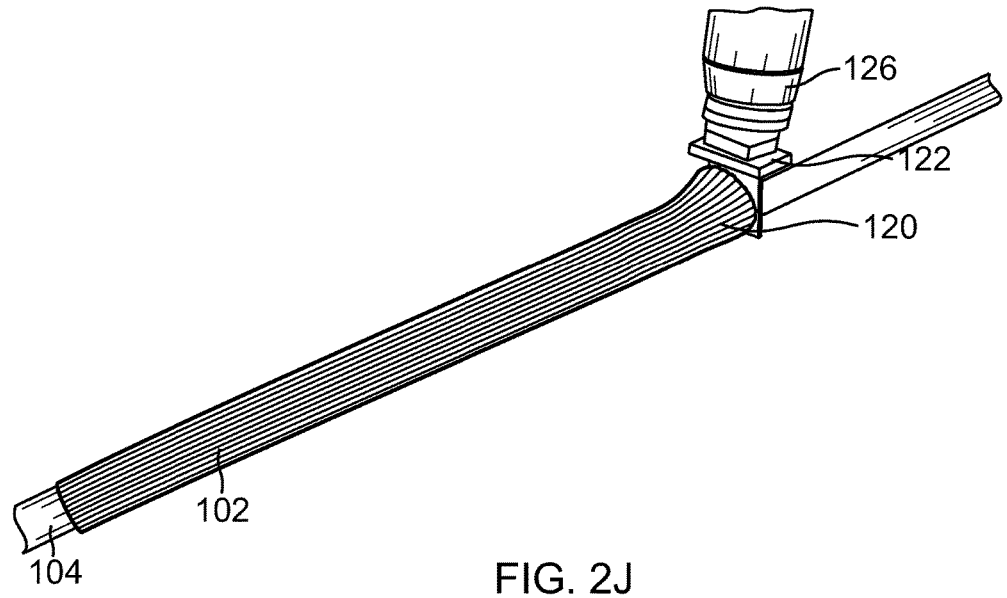

As illustrated in FIG. 2H, the magnetized flange 122 is then brought into abutment with the cuff 120 in the sleeve 102, such that the flange 122 exerts a longitudinally directed magnetic attractive force on the ring 106 through the thickness of the sleeve 102, and the magnetized flange 122, and hence, the ring 106 and the cuff 120, are then urged longitudinally along the mandrel 102 and toward the opposite, second end 112 thereof at a predetermined rate, such that the sleeve 102 is inverted over the outer surface of the mandrel 104. As discussed above, the longitudinal tension exerted on the sleeve 102 during the urging can be controlled by controlling one, the other, or both of the magnetic force exerted by the magnetized flange 122 on the ring 106 and the rate at which the flange 122 is urged along the mandrel 104.

As illustrated in FIGS. 3A-3D, 4A-4D and 5A-5D, respectively, the preliminary arrangement of the various elements before the inversion of the sleeve 102 over the mandrel 104, and particularly, the step of fixing the first end 118 of the sleeve 102 against movement relative to the first end 110 of the mandrel 104, can be implemented in ways that are similar but different.

Figure 3A:
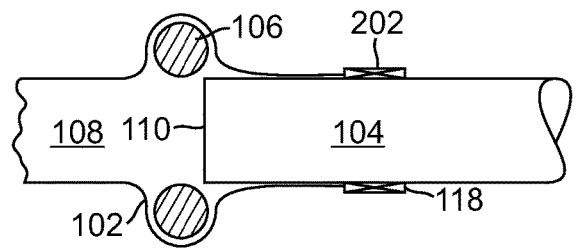
FIGS. 3A-3D are partial cross-sectional views illustrating the successive steps involved in the example method of FIGS. 2A-2J.
Figure 3B:
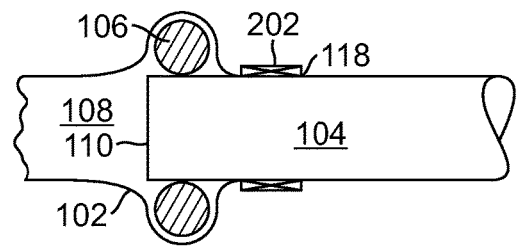
Figure 3C:
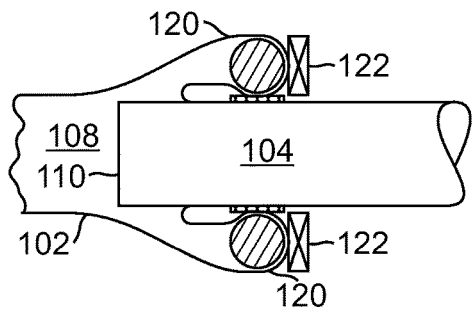
Figure 3D:
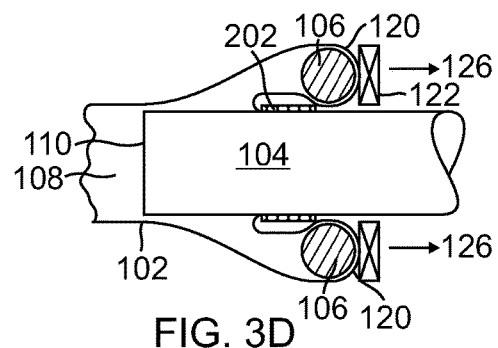

For example, FIGS. 3A-3D are partial cross-sectional views illustrating the successive steps involved in the example method of FIGS. 2A-2J. Thus, in FIG. 3A, the ring 106 is placed in the lumen 108 of the sleeve 102, a first end portion of the sleeve 102 is disposed over a first end portion of the mandrel 104, and the first end 118 of the sleeve 102 is secured to the mandrel 104 with a clamping band 202 of adhesive tape. In FIGS. 3B and 3C, the ring 106 is slid over the first end 110 of the mandrel 104, and then, over the clamping band 202 so as to form the circumferential cuff 120 in the sleeve 102, with the ring 106 disposed therein, and with the cuff 120 and the ring 106 respectively disposed in abutment with or immediately adjacent to the magnetic flange 122. In FIG. 3D, the magnetized flange 122 is urged longitudinally along the mandrel 104 in the direction of the arrows 126 so as to invert the sleeve 102 over a desired portion of the length of the mandrel 104.

Figure 4A:
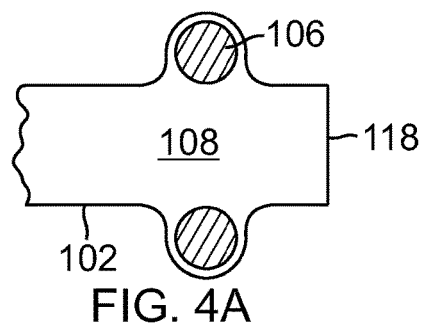
FIGS. 4A-4D are partial cross-sectional views illustrating successive steps involved in another example method for placing a sleeve onto an elongated mandrel.
Figure 4B:
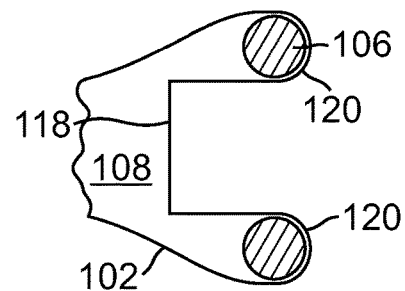
Figure 4C:
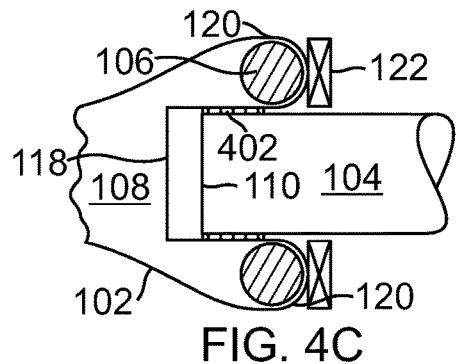
Figure 4D:
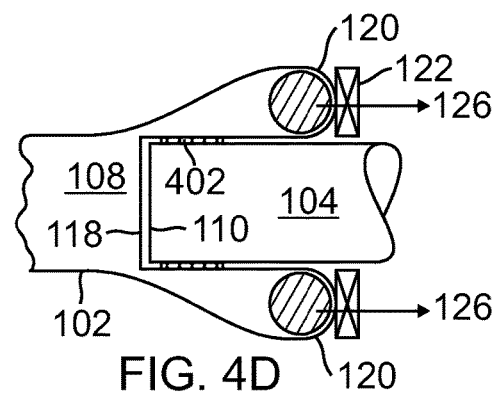

A similar method is illustrated in FIGS. 4A-4D, with the following differences. Thus, in FIG. 4A, the ring 106 is inserted within the lumen 108 of the sleeve 102, and in FIG. 4B the first end 118 of the sleeve 102 is then tucked back though the central opening of the ring 106 so as to form the circumferential cuff 120 in the sleeve 102, with the ring 104 disposed therein. Meanwhile, as illustrated in FIG. 4C, an adhesive band 402 is formed on the mandrel 104 adjacent to its front end 110. In one embodiment, this can be implemented by wrapping a band 402 of double-backed adhesive tape on the mandrel 104. In another embodiment, it can be implemented by placing a veil of, e.g., a thermoplastic material on the mandrel 104, then heating the material to a softened, sticky state. In one possible embodiment, the heating can be effected by placing the ring 102 near or directly over the adhesive band 402, then heating the ring 106 using inductive heating until the band 402 is heated to the sticky state. In either case, as illustrated in FIG. 4C, the circumferential cuff 120 and the ring 106 can then be slipped over the first end 110 of the mandrel 104 such that an internal circumferential area of the sleeve 102 is inverted over and adhered to the mandrel 104 by the adhesive band 402, with the cuff 120 and ring 106 disposed against the magnetic flange 122. As illustrated in FIG. 4D, the sleeve 102 can then be inverted over the desired length of the mandrel 104 in a manner similar to that discussed above in connection with FIG. 3D.

Figure 5A:
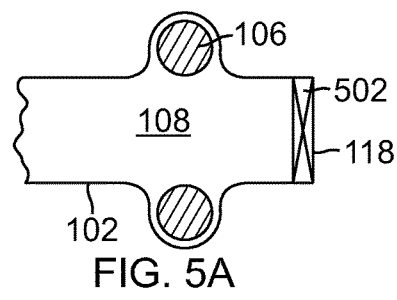
FIGS. 5A-5D are partial cross-sectional views illustrating successive steps involved in another example method for placing a sleeve onto an elongated mandrel.
Figure 5B:
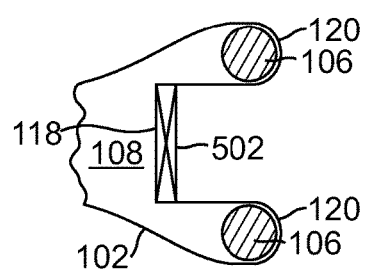
Figure 5C:
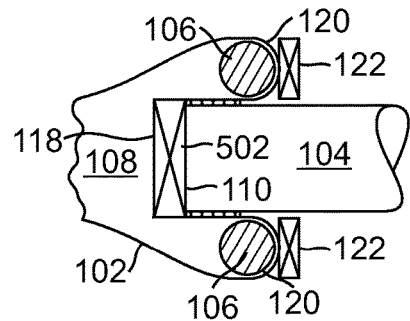
Figure 5D:
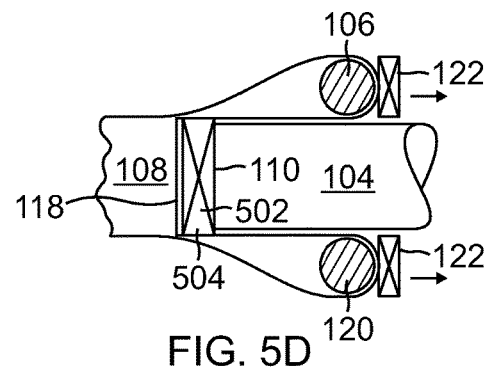

The example method illustrated in FIGS. 5A-5D is similar to those discussed above, with following differences. In FIG. 5A, the ring 106 is inserted into the lumen 108 of the sleeve 102, and a closure 502 is then formed at the first end 118 of the sleeve 102. The closure 502 can comprise, for example, a twist-tie that cinches the sleeve 102 shut, or a plastic "puck" that is internally bonded to the sleeve 102 at the first end 118 thereof. As illustrated in FIG. 5B, the first end 118 of the sleeve 102 and the closure 502 therein are then tucked back through the central opening of the ring 106 so as to define the circumferential cuff 120, with the ring 106 disposed therein. In FIG. 5C, the cuff 120 and ring 106 are then slid over the first end 110 of the mandrel 104 until the closure 502 is disposed in abutment with the first end 110 of the mandrel 104, thereby fixing the first end 118 of the sleeve 102 against movement relative to the first end 110 of the mandrel 104. As illustrated in FIG. 5D, the sleeve 102 can then be inverted over the desired length of the mandrel 104 in a manner similar to that discussed above in connection with FIGS. 3D and 4D.

It may be noted that the methods described in FIGS. 3A-3D and FIGS. 4A-4D can be utilized to place the sleeve 120 anywhere along the length of the mandrel 104, e.g., mid-mandrel, whereas, the method of FIGS. 5A-5D is more directed to placement of the sleeve 102 at or near the first end 110 of the mandrel 104.

As discussed above, some or all of the steps described above in connection with each of FIGS. 3A-3D, 4A-4D and 5A-5D can be implemented manually or by the use of automated equipment, although the latter approach clearly provides benefits over the former in terms of speed, reliability, repeatability, accuracy, and reduced costs of manufacture. Further, as those of some skill in the art will understand, other methods of inverting the sleeve 102 over the mandrel 104 can be confected, depending on the particular application at hand, and accordingly, the methods illustrated and described above in connection with these figures should be considered as exemplary in nature, and not in any sense as limiting.

Figure 6:
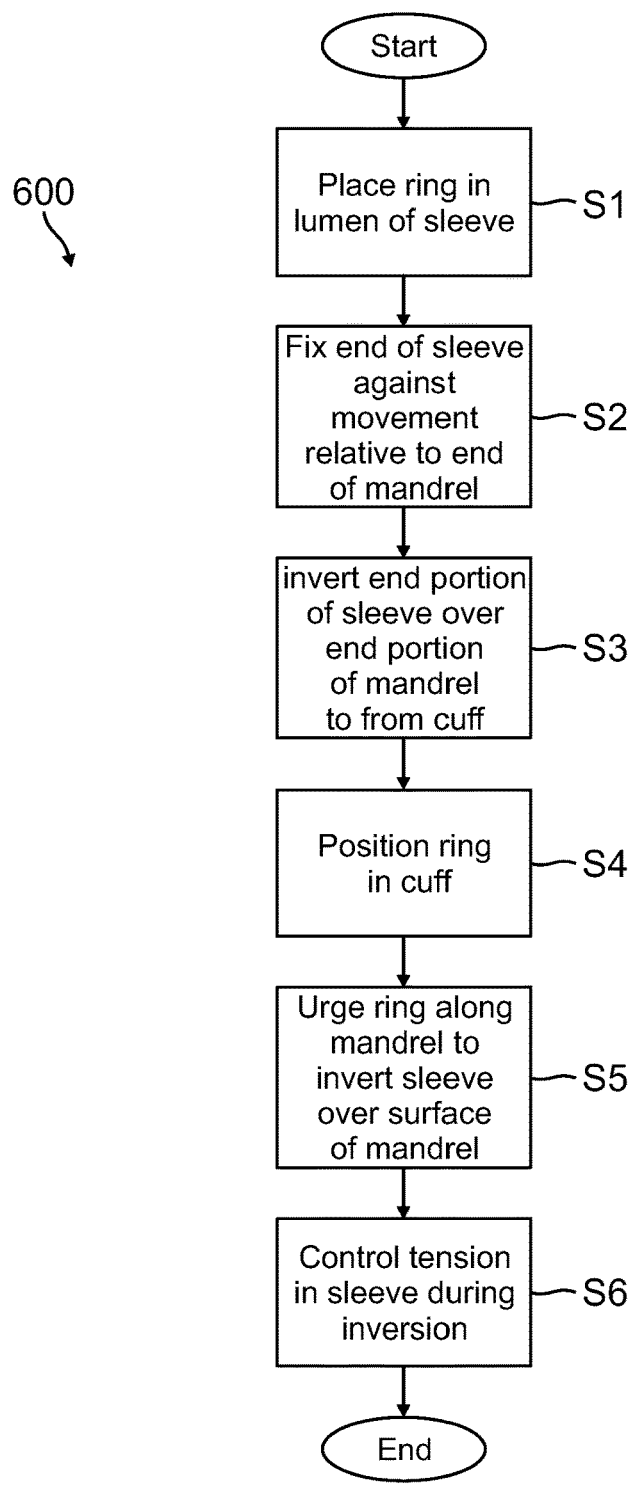
FIG. 6 is a process flow diagram illustrating another example embodiment of a method for placing a flexible sleeve onto an elongated mandrel in accordance with the disclosure.

FIG. 6 is a process flow diagram illustrating a generalized example embodiment 600 of a method for placing a flexible sleeve 102 onto an elongated mandrel 104 in accordance with the disclosure. Thus, at S1 of the method 600, the ring 106 is inserted into the lumen 108 of the sleeve 102. At S2, the first end 118 of the sleeve 102 is fixed against movement relative to the first end 110 of the mandrel 104. At S3, a first end portion of the sleeve 102 is inverted over a first end portion of the mandrel 104 so as to define the circumferential cuff 120 in the sleeve 102, and at S4, the ring 106 is positioned concentrically within the circumferential cuff 120. At S6, the ring 106 is urged longitudinally along the mandrel 104 and toward the opposite, second end 112 thereof by the magnetic flange 122, such that the sleeve 102 is inverted over the outer surface of the mandrel 104, and at S7, the longitudinal tension in the sleeve 102 is precisely controlled during the urging by controlling one, the other, or both of the magnetic force exerted by the magnetic flange 122 on the ring 106 and the rate at which the magnetic flange 122 is urged along the mandrel 104.

Figure 7:
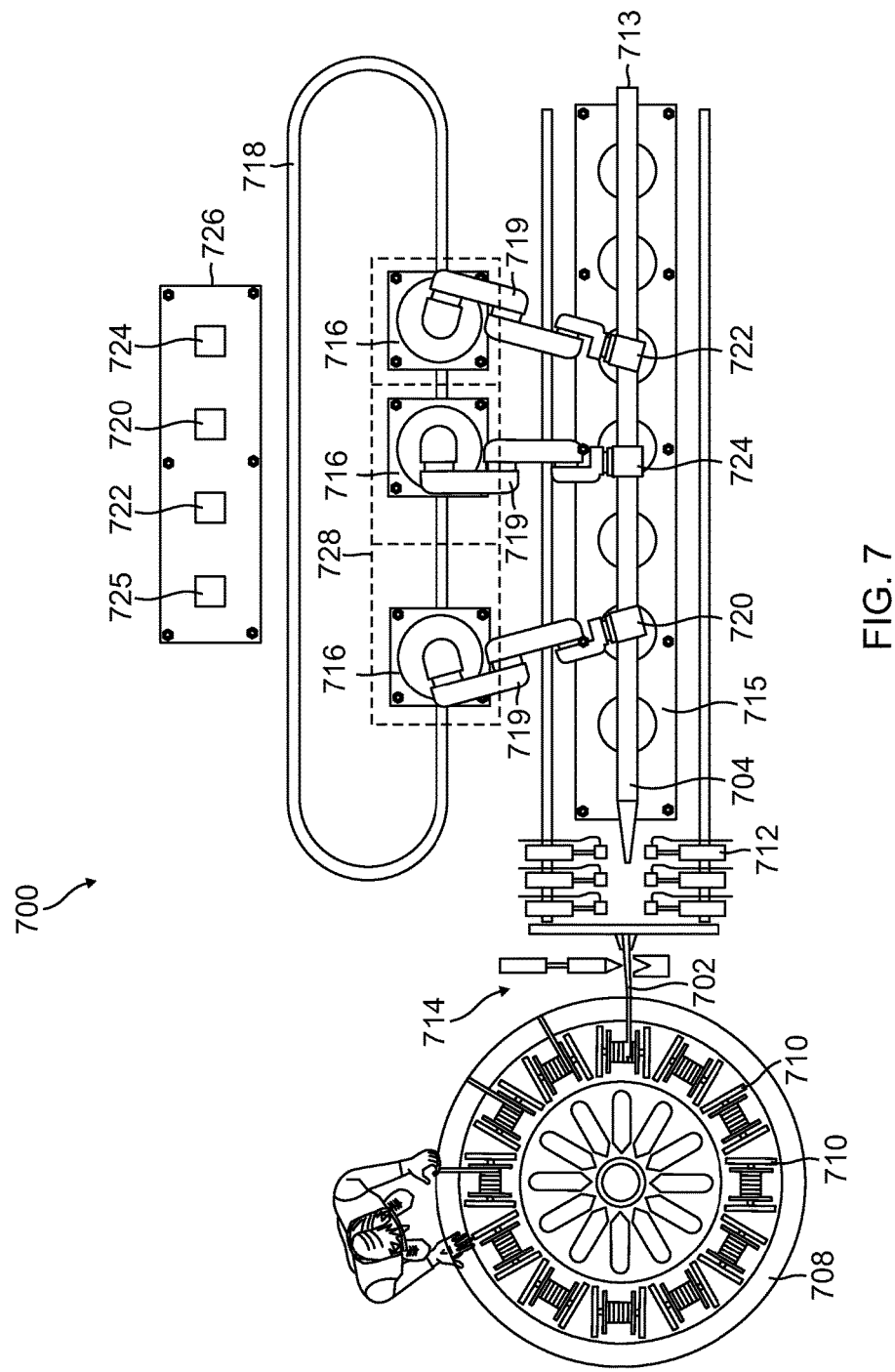
FIG. 7 is a plan view of an example embodiment of an automated system for placing a flexible sleeve onto an elongated mandrel in accordance with the disclosure.

FIG. 7 is a top plan view of an example embodiment of an automated system 700 for placing a flexible sleeve 702 onto an elongated mandrel 704 in accordance with the disclosure. As illustrated in FIG. 7, the example system 700 comprises a rotatable sleeve carousel 708 that includes a number of reels 710 rotatably disposed thereon, each of which has an associated sleeve 702 wound thereon. The sleeves 702 respectively wound on the reels 710 can vary from one to the other in one or more selected parameters, e.g., weave, internal diameter, and the like. The sleeve carousel 708 is configured to present, e.g., in a rotating carousel fashion, a selected one of the reels 710 and its associated sleeve 702 to a first or lead-in end of the mandrel 704 for subsequent placement thereon.

Once the sleeve 702 is presented for placement on the mandrel 704, it must be supported and expanded for insertion therein of the ring 706 (not seen in FIG. 7), as described above in connection with, e.g., FIGS. 2A and 2B. In the example system 700, these functions can be effected using one or more lead-in devices 712 disposed adjacent to the lead-in end of the mandrel 704, or in an alternative embodiment, by a pneumatic system, such as one or more Bernoulli cups (not illustrated). A length cutter 714 can be disposed between the sleeve carousel 708 and the lead-in devices 712 and configured to cut the sleeve 704 after the desired length of sleeve 702 has been spooled off of its associated reel 710.

As discussed above, the mandrel 704 can be cantilevered horizontally at its second end 713 and/or, in the case of longer mandrels 704, can be supported against sagging in a manner in which it is simultaneously supported whilst a sleeve 702 is being placed over it. In the particular example embodiment illustrated, the mandrel 704 is supported along its cantilevered length by one or more of the end-effectors 720, 722 and 724 described in more detail below, and/or by an underlying support plate 715.

In the example system 700 illustrated, a number of robots 716 are mounted on an oval-shaped track 718 for independent movement thereon. The continuous-loop track 718 is disposed adjacent and parallel to the mandrel 704. Each of the robots 716 is equipped with an arm 719 having a distal end that is moveable by the associated robot 716 in multiple degrees of freedom. Each of the distal ends of the robot arms 719 can be provided with one of a plurality of interchangeable end-effectors 720, 722, 724 or 725 operably disposed thereon. As illustrated in FIG. 7, the system 700 can include an end-effector "exchange," or magazine 726, at which each robot 716 can drop off an associated end-effector 720, 722, 724 or 725 after its use, and from which each robot 716 can select and load another end-effector 720, 722, 724 or 725 for subsequent use.

In the particular system 700 illustrated, one robot end-effector 720 comprises a mechanism used to apply an interface material (e.g., a thermoplastic veil or a thermosetting binder) of the type discussed above and used to bond the sleeve 702 to, e.g., the mandrel 704. Another end-effector 722 comprises a magnetic mechanism used to simultaneously guide and tension the sleeve 702 as it is inverted over the mandrel 704, as also discussed above. Another robot end-effector 724 comprises a mechanism used to seal and cut the sleeve 702 at a selected point along the mandrel 704. As discussed above, this process can be performed via an induction heating of the ring 706 by the end effector 724 to heat the interface material to a sticky state.

In the example system 700 of FIG. 7, a machine vision and automatic control system 728 (indicated by the dashed lines) can be implemented to ensure that the placement of the sleeve 702 on the mandrel 704 is accurate and free of wrinkles. In the particular embodiment illustrated, each of the robots 716 is provided with its own machine vision component(s), e.g., a camera, and control system, such that each robot 716 is capable of programmable automatic operation independently of the others, but the control system 728 can also include means for integrating the control of the robots 716 such that they are also capable of operating simultaneously and in cooperation with each other. The machine vision and control system 728 can incorporate force sensing on the robot end-effectors 720, 722, 724 and 725 and thereby adjust end-effector velocity and magnetic force in order to maintain a desired, pre-programmed sleeve tension parameter.

As those of some skill will understand, the system 700 can be implemented in a variety of ways. For example, each of the end-effectors 720, 722 724 and 725 described do not necessarily need to be mounted to a robot 716, but instead, could form the basis of a hand operated tool.

As those of some skill will appreciate, the systems and methods of the present disclosure have numerous benefits over the existing manual sleeve placement processes. Firstly, they enable automation of the process of installing flexible braided sleeves onto elongated mandrels. They are highly repeatable and result in a high quality product with consistent braid matrix angle along the mandrel surface. Longitudinal tension in the sleeve is easily and precisely controlled by varying longitudinal pulling velocity of the ring, and the frictional force exerted on the sleeve by and between the ring and the magnet during the pulling. The process is reliable, due to the system's simple design. It eliminates the need for multiple operators to handle the material during placement, thereby reducing FOD and EHS issues. The sleeve can be fed from a reel, thereby rendering the system infinitely scalable, particularly in sleeve placement lengths of >>500 in. The ring can be heated, e.g., through induction, to facilitate pre-forming and/or other process conditions.

Indeed, as those of some skill will by now appreciate, and depending on the specific application at hand, many modifications, substitutions and variations can be made in and to the materials, apparatus, configurations and methods of the present disclosure without departing from its spirit and scope. In light of this, the scope of the present invention should not be limited to those of the particular embodiments illustrated and described herein, as they are merely by way of some examples thereof, but rather, should be fully commensurate with that of the claims appended hereafter and their functional equivalents.

What is claimed is:

1. A method for drawing a flexible sleeve over an elongated mandrel, the method comprising:
   placing a ring within a lumen of the sleeve;
   fixing a first end of the sleeve against movement relative to a first end of the mandrel;
   inverting a first end portion of the sleeve over a first end portion of the mandrel so as to define a circumferential cuff in the sleeve;
   positioning the ring concentrically within the circumferential cuff; and
   urging the ring longitudinally along the mandrel and toward an opposite, second end thereof, such that the sleeve is inverted over an outer surface of the mandrel.

2. The method of claim 1, wherein the ring comprises a ferrous material and the urging comprises
   placing a magnet adjacent to the ring, such that the sleeve is disposed between the ring and the magnet, and the magnet exerts a longitudinal magnetic force on the ring; and
   moving the magnet longitudinally along the mandrel and towards the second end thereof at a selected rate.

3. The method of claim 2, further comprising controlling a longitudinal tension exerted on the sleeve during the urging.

4. The method of claim 3, wherein the controlling comprises controlling one, the other, or both of the magnetic force exerted by the magnet on the ring and the rate at which the magnet is urged along the mandrel.

5. The method of claim 4, wherein the magnet comprises an electromagnet, and wherein the controlling comprises controlling an electrical current of the electromagnet.

6. A machine for drawing a flexible sleeve over an elongated mandrel, the machine comprising:
   a ring disposed within a lumen of the sleeve; and
   an urging mechanism configured to urge the ring longitudinally along the mandrel and toward an opposite, second end thereof, such that the sleeve is inverted over an outer surface of the mandrel, wherein
   a first end of the sleeve is fixed against movement relative to a first end of the mandrel,
   a first end portion of the sleeve is inverted over a first end portion of the mandrel so as to define a circumferential cuff in the sleeve, and
   the ring is positioned concentrically within the circumferential cuff;
   wherein the ring comprises a ferrous material and the urging mechanism comprises a magnet disposed adjacent to the ring, such that the sleeve is disposed between the ring and the magnet and the magnet exerts a magnetic force on the ring through the sleeve; and
   a second mechanism configured to urge the magnet longitudinally along the mandrel at a selected rate.

7. The machine of claim 6, further comprising a third mechanism configured to control a longitudinal tension exerted on the sleeve during the urging.

8. The machine of claim 7, wherein the third mechanism comprises a fourth mechanism configured to control one, the other, or both of the magnetic force exerted by the magnet on the ring and the rate at which the magnet is urged along the mandrel.

9. The machine of claim 8, wherein the fourth mechanism comprises a fifth mechanism configured to control the magnetic force at selected circumferential locations around the magnet.

10. The machine of claim 8, wherein
    the magnet comprises a permanent magnet or an electromagnet, and
    the fourth mechanism comprises sixth mechanism configured to control an electrical current of the electromagnet.

11. The machine of claim 6, wherein the sleeve comprises braided fibers or veil of a thermoplastic material.

12. The machine of claim 11, wherein the fibers are bi-axially braided.

13. The machine of claim 11, wherein the fibers comprise carbon, glass, aramid, or basalt.

14. The machine of claim 6, further comprising a tapered surface extending longitudinally from the first end of the mandrel and configured to feed the sleeve smoothly onto the first end of the mandrel.

15. A system for drawing a flexible sleeve over an elongated mandrel, the system comprising:
    means for inserting a ring within a lumen of the sleeve;
    means for fixing a first end of the sleeve against movement relative to a first end of the mandrel,
    means for inverting a first end portion of the sleeve over a first end portion of the mandrel so as to define a circumferential cuff in the sleeve;
    means for positioning the ring concentrically within the circumferential cuff; and
    means for urging the ring longitudinally along the mandrel and toward an opposite, second end thereof at a selected rate, such that the sleeve is inverted over an outer surface of the mandrel.

16. The system of claim 15, further comprising:
    at least one robot moveable along a track disposed parallel to the mandrel; and
    an arm disposed on the at least one robot, the arm having a distal end that is moveable by the robot in multiple degrees of freedom,
    wherein at least one of the inserting means, the fixing means, the inverting means, the positioning means and the urging means comprises an end effector disposed at the end of the arm.

17. The system of claim 15, further comprising:
    a sleeve carousel containing at least one reel rotatably disposed thereon, wherein
    the sleeve is wound on the at least one reel, and
    the sleeve carousel is configured to position the first end of the sleeve in coaxial juxtaposition with the first end of the mandrel.

18. The system of claim 15, wherein the mandrel is disposed horizontally, and further comprising means for supporting the mandrel along its length while the sleeve is being inverted over it.

19. The system of claim 15, further comprising a machine vision and control system configured to automatically control one or more of the inserting means, the fixing means, the inverting means, the positioning means, the urging means, the at least one robot, and/or the sleeve carousel in accordance with a predefined program.

* * * * *